Aug. 13, 1968  D. G. DAYHOFF  3,396,468
DENTAL APPLIANCE
Filed May 18, 1966
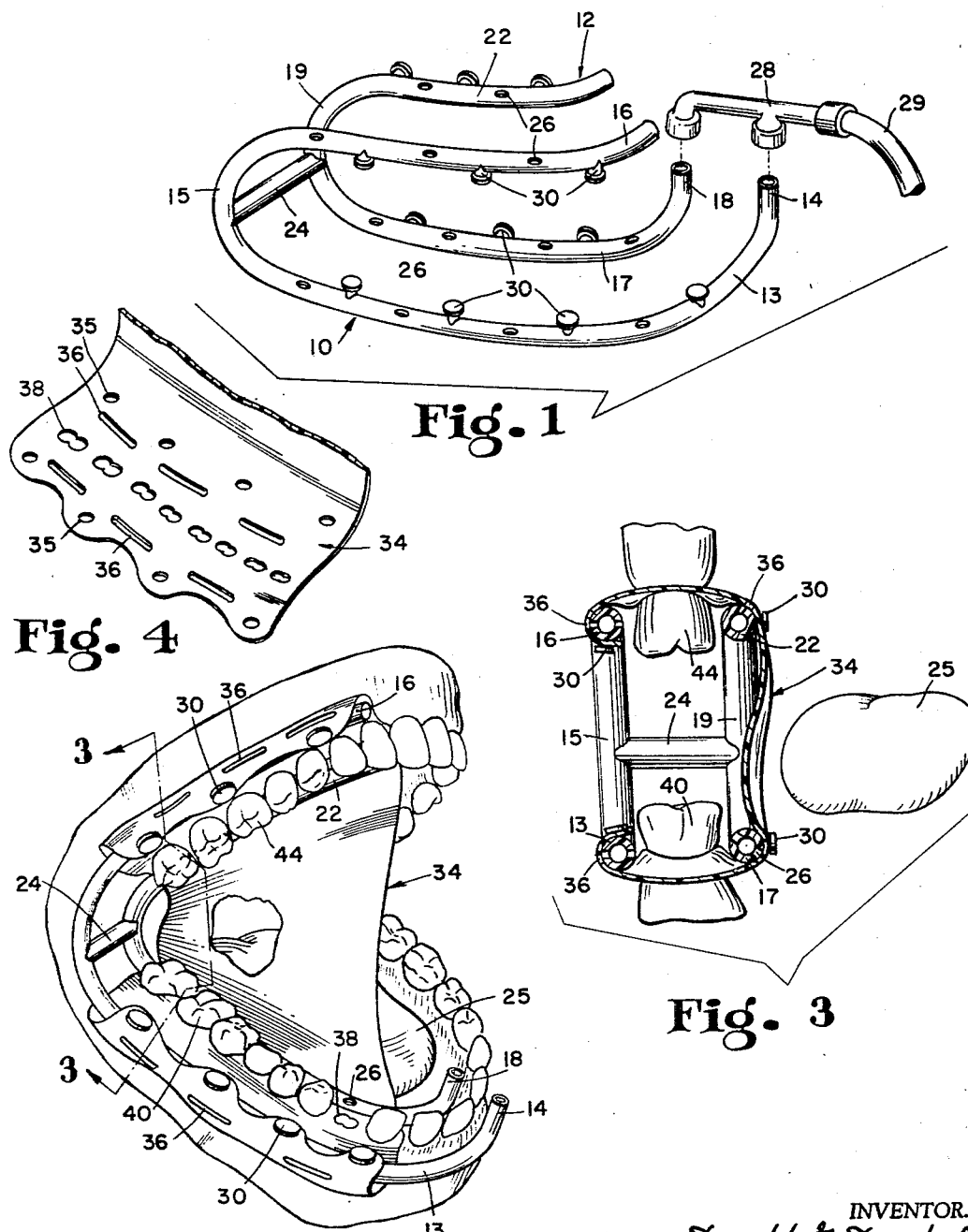
INVENTOR.
Donald G. Dayhoff
BY
Trask, Jenkins & Hanley
ATTORNEYS

United States Patent Office 3,396,468
Patented Aug. 13, 1968

3,396,468
DENTAL APPLIANCE
Donald G. Dayhoff, 2042 Kessler Blvd., N. Drive,
Indianapolis, Ind. 46222
Filed May 18, 1966, Ser. No. 551,008
9 Claims. (Cl. 32—33)

This invention relates to a dental appliance, and more particularly to an appliance for improving the operating field in a patient's mouth.

It is an object of the invention to provide a dental appliance which will remove fluids from a patient's mouth, which will fit comfortably in the patient's mouth, and which can be quickly and easily placed in an operative position in the patient's mouth. It is a further object of the invention to provide an appliance for use in dental treatment which can remain in the patient's mouth while the dentist makes occlusal checks, radiographs the patient's teeth, makes certain anesthetic reinjections when necessary, and for facilitated placement of topical applications.

In accordance with one form of the invention, there is provided a framework comprising a pair of first and second generally U-shaped tubular members having upper and lower portions adapted to fit the patient's mandibular and maxillary arches. The first of said members is adapted to lie exteriorly of said arches, and the second member is adapted to lie interiorly of said arches. The pair of members are interconnected by a third tubular member intermediate their lengths at a position adjacent the posterior portion of the patient's mouth. Said first and second members are provided with pluralities of longitudinally spaced openings and are adapted to be removably connected to a vacuum source for thus withdrawing saliva and other fluids from the patient's mouth through said openings.

A plurality of longitudinally spaced studs are provided on the first and second members. Said studs are receivable in openings formed in a flexible sheet for thus mounting said sheet on the framework. The sheet is perforated to seat over the patient's teeth and is mountable on the framework to extend continuously from the first to the second member over the patient's lower teeth, from the lower to the upper portion of the second member, and from the second to the first member over the patient's upper teeth. In this manner, said sheet isolates the patient's teeth from the gums and tongue. Pluralities of openings are formed in the sheet in alignment with the openings in the first and second members so that said members can evacuate fluids both from around the teeth over which the sheet extends and from the other adjacent portions of the mouth.

Other objects and features of the invention will become apparent from the more detailed description which follows and from the accompanying drawings in which:

FIG. 1 is an exploded perspective view of the tubular framework embodying my invention;

FIG. 2 is a perspective view of my invention shown in operative position in a patient's mouth;

FIG. 3 is a vertical section taken on the line 3—3 of FIG. 2; and

FIG. 4 is a perspective view of one half of the flexible sheet shown in FIG. 2.

As shown in the drawings, the framework for my invention comprises a pair of generally U-shaped tubular members 10 and 12 conveniently formed from a resilient plastic material. The member 10 is provided with a lower portion 13 adapted to lie buccally of the patient's mandibular arch and terminating at its anterior end in an open upwardly directed projection 14. The posterior end of the portion 13 is continuous with an upwardly curved bight 15. Said bight is in turn continuous with an upper portion 16 adapted to lie buccally of the patient's maxillary arch and having its anterior end closed. In a like manner, the tubular member 12 comprises a lower portion 17 terminating at its anterior end in an open upwardly directed projection 18. The lower portion 17 is adapted to lie lingually of the patient's mandibular arch and is continuous at its posterior end with an upwardly curved bight 19. The bight 19 is in turn continuous with an upper portion 22 adapted to lie palatally to the maxillary arch and having its anterior end closed. The members 10 and 12 are interconnected at their bights by a cross tube 24 in open communication with the interiors of the members 10 and 12 and disposed posteriorly of the patient's third molar.

As shown in FIG. 1, the members 10 and 12 lie in generally parallel planes and have their anterior portions curved inwardly to conform to the curvature of the mandibular and maxillary arches. Desirably, the inward curvature of the member 12 is slightly greater than the normal curvature of the mandibular and maxillary arches. Therefore, if the patient has small sharply curved arches, the member 12 will be accommodated within the mouth. Conversely, if the patient has large rounded arches, the member 12 will merely tend to crowd the tongue 25, but this will not adversely affect the operation of the appliance. Thus, when the appliance is placed in a mouth having large arches, the member 10 will be accommodated against the exterior portions of said arches, and when the appliance is used in a mouth having smaller arches, said member will tend to crowd against the facial tissues of the patient, but these tissues are sufficiently pliable to accept the crowding of said member.

As shown in FIG. 1, pluralities of openings 26 are longitudinally spaced along the upper and lower portions of the members 10 and 12 to thus admit the saliva and other fluids into said members. These fluids are evacuated from the members through the open anterior projections 14 and 18. As shown, the projections 14 and 18 are adapted to be removably joined to a generally F-shaped connector 28 connected to a vacuum line 29 for thus withdrawing the fluids from the patient's mouth.

A plurality of studs 30 are formed on the lower portions 13 and 17 and upper portions 16 and 22 of the members 10 and 12. Desirably, as shown in FIG. 3, the studs on the member 10 are formed on the upper and lower faces of the portions 13 and 16, respectively, and the studs are formed on the inner faces of the portions 17 and 22 of member 12. Said studs serve as mounting members for a flexible elastic sheet or dam 34 adapted to be mounted on the framework. As shown in FIG. 4, the sheet 34 has a first set of openings 35 receivable over the studs 30 for mounting said sheet on the framework. It is also provided with a second set of openings 36 adapted to be disposed in alignment with the openings 26 when it is mounted in operative position on the framework. And it is provided with a third set of openings 38 generally parallel to rows of openings 35 and 36 and receivable over the patient's teeth when it is in operative position. The openings 38 can be formed in the sheet after it is mounted on the framework in the patient's mouth, or alternatively, said openings can be formed prior to mounting the sheet on the framework after a survey has been made of the patient's mouth to determine the proper spacing and size of the openings 38.

As shown in FIG. 3, one margin of the sheet 34 is mounted on the studs 30 on the tube portion 13. The sheet extends from the portion 13 over the lower teeth 40 and is mounted on the studs on the lower portion 17 of member 12. Said sheet bridges the space between the portions 17 and 22 of member 12 between the tongue 25 and said member, and is mounted on the studs on the portion 22. It then extends from the portion 22 over the upper teeth 44 and is connected along its margin to the studs on the upper portion 16 of member 10. As shown in FIG. 3, with the sheet in its operative position, its openings 36 will be disposed in alignment with the openings 26 in the framework to permit the vacuum line 29 to extract saliva and other fluids from the patient's mouth. Further, the area of the sheet bridging between the portions 17 and 22 of member 12 will prevent the tongue 25 from interfering with the operations involved. And with the openings 38 causing the sheet to seat around each of the patient's teeth, each of said teeth will be isolated to thus give the dentist a dry field in which to work.

With the members 10 and 12 being formed from a flexible plastic material, their upper portions 16 and 22 can flex toward and away from their lower portions 13 and 17. Thus, upon removal of the connector 28, the patient can, with the appliance remaining in his mouth as illustrated in FIG. 2, close the upper teeth 44 against the lower teeth 40 so that the dentist can make an occlusional check of the teeth. The cross tube 24, being posteriorly of the patient's teeth, will not interfere with the patient closing his mouth to make such a check. Further, with the members 10 and 12 and the sheet 34 being made from nonmetallic materials, radiographs of the patient's teeth can also be made with the appliance in position in the mouth.

The embodiment illustrated in the drawings is, of course, adapted to be used on the right side of the patient's mouth. A device for use on the left side of the patient's mouth would be like that illustrated except for the difference in curvature of the members 10 and 12. If it is desired to employ the appliance in only one quadrant of the patient's mouth, the members 10 and 12 can, of course, terminate immediately above the cross tube 24. In such an embodiment, the sheet 34 can be substantially narrower since it will not bridge between upper and lower portions of the member 12 or extend over two rows (upper and lower) of teeth.

I claim:

1. A dental appliance, comprising flexible first and second generally U-shaped tubular members adapted to lie, respectfully, buccally along a patient's mandibular and maxillary arches and lingually and palatally along said mandibular and maxillary arches, said first and second members having pluralities of openings formed therein, a third tubular member interconnecting said first and second members intermediate their lengths, means for connecting said first and second members to a vacuum source, pluralities of projections on said first and second members, and a flexible sheet having openings formed therein for reception over said projections whereby said sheet can extend over the teeth in the mandibular and maxillary arches and lingually and palatally bridge the space between said arches.

2. A dental appliance as set forth in claim 1 in which said first and second members have upwardly directed projections at the anterior ends, and said means is a connector removably mounted on said projections.

3. A dental appliance as set forth in claim 1 in which said third tubular member interconnects said first and second tubular members at their bights.

4. A dental appliance as set forth in claim 1 in which said sheet has pluralities of openings formed therein in alignment with the openings in said first and second members.

5. A dental appliance as set forth in claim 1 in which the projections on said first member are disposed in an opposed vertical orientation and the projections on said second member project horizontally inwardly therefrom.

6. A dental appliance as set forth in claim 1 in which said sheet has a first set of openings receivable over said projections, a second set of openings adapted to be disposed in alignment with the openings in said first and second members, and a third set of openings receivable over said teeth.

7. A dental appliance, comprising a pair of tubular members adapted to lie along the opposed sides of a row of teeth and having pluralities of openings formed therein, means interconnecting said members, means removably connected to said members for connecting them to a vacuum source, and a flexible perforated sheet removably mounted on said members to extend over said teeth.

8. A dental appliance as set forth in claim 5 in which said members lie in generally parallel planes and said second mentioned means is removably connected to one end of said members.

9. A dental appliance as set forth in claim 7 in which said first mentioned means is a cross tube to dispose said first and second members in open communication with each other.

References Cited

UNITED STATES PATENTS

| | | | |
|---|---|---|---|
| 1,202,264 | 9/1916 | Brown | 32—33 |
| 2,873,528 | 2/1959 | Thompson | 32—33 |
| 2,937,445 | 5/1960 | Erickson | 32—33 |
| 3,049,806 | 8/1962 | Cofresi | 32—33 |

FOREIGN PATENTS 691,434   4/1940   Germany.

LOUIS G. MANCENE, *Primary Examiner.*

R. PESHOCK, *Assistant Examiner.*